US005136657A

United States Patent [19]

Hattori

[11] Patent Number: 5,136,657

[45] Date of Patent: Aug. 4, 1992

[54] SOUND DEVICE MOUNTED IN A HELMET

[75] Inventor: Noriaki Hattori, Kawagoe, Japan

[73] Assignee: Honda Giken Kogyo Kabushiki Kaisha, Tokyo, Japan

[21] Appl. No.: 317,250

[22] Filed: Feb. 28, 1989

[30] Foreign Application Priority Data

Feb. 28, 1988 [JP] Japan ................................ 63-45555

[51] Int. Cl.[5] ..................... H04R 25/00; H04M 1/00; A42B 7/00

[52] U.S. Cl. .................................. 381/187; 381/183; 381/188; 379/430; 2/421

[58] Field of Search ............... 381/187, 188, 151, 159, 381/183; 379/430; 2/421, 422

[56] References Cited

U.S. PATENT DOCUMENTS

| | | | |
|---|---|---|---|
| 3,088,002 | 4/1963 | Heisig | 381/187 |
| 3,187,115 | 6/1965 | Mullin | 381/68.5 |
| 3,190,973 | 6/1965 | Aileo | 381/187 |
| 4,130,803 | 12/1978 | Thompson | 455/344 |
| 4,400,591 | 8/1983 | Jennings et al. | 381/187 |
| 4,471,174 | 9/1984 | Nava | 379/430 |
| 4,517,417 | 5/1985 | Murayama | 379/430 |
| 4,556,121 | 12/1985 | Palmaer et al. | 381/187 |
| 4,636,592 | 1/1987 | Scott | 181/187 |

FOREIGN PATENT DOCUMENTS

| | | | |
|---|---|---|---|
| 1591712 | 6/1981 | United Kingdom | 2/422 |
| 2099680 | 12/1982 | United Kingdom | 2/421 |

*Primary Examiner*—James L. Dwyer
*Assistant Examiner*—Jason Chan
*Attorney, Agent, or Firm*—Armstrong, Nikaido, Marmelstein, Kubovcik & Murray

[57] ABSTRACT

A helmet having a sound device therein, includes a shell of a rigid material for protecting the head of a wearer, a liner mounted inside the shell and filled with a buffer material, and a speaker mounted inside a lower end portion of the shell or inside of the chin guard of the helmet. The speaker may be facing inwardly or outwardly. A plurality of speakers may also be employed. The positioning of the speaker as described above enables the wearer of the helmet to hear the sounds from the speaker without altering the shape of the helmet shell to position the speaker near the ears.

16 Claims, 16 Drawing Sheets

FIG. 16
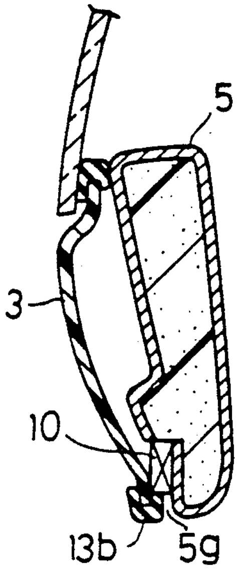
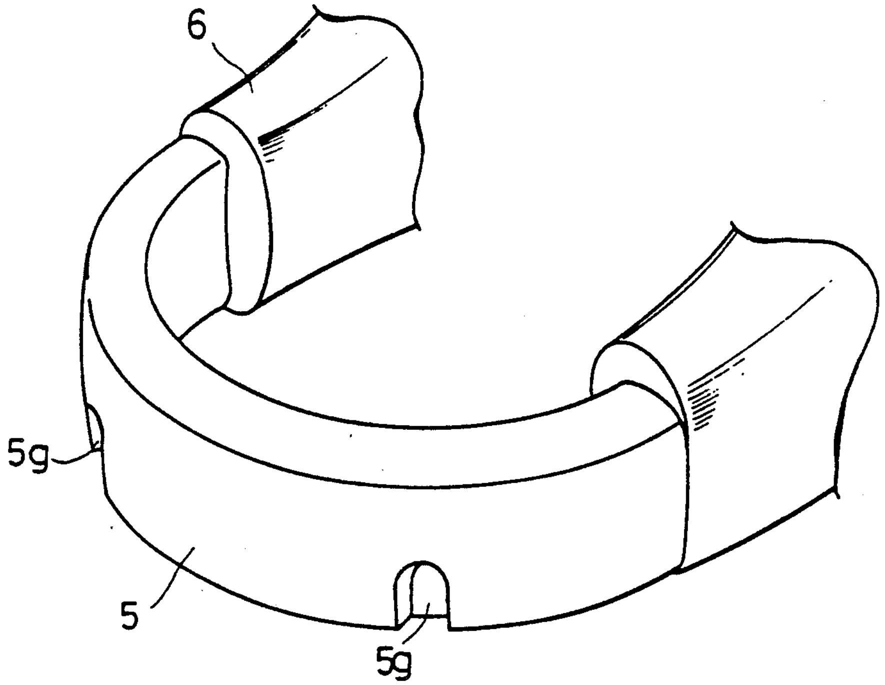
FIG. 17

SOUND DEVICE MOUNTED IN A HELMET

BACKGROUND OF THE INVENTION

The present invention relates to a sound device including a helmet provided with a speaker therein. More specifically, it relates to a helmet having a speaker mounted in a lower end position thereof. A speaker provided in a helmet at its top portion and in the vicinity of the ears of the wearer and on both sides thereof, is well known. Since the shell of a helmet is close to the head in the top and side portion thereof, it is difficult to mount a speaker near the ears without forming protrusions on the external surface of the helmet shell. Therefore, it is practically difficult to mount the speaker in the side or top portion of the helmet for design reasons.

It is, therefore, an object of the present invention to provide a helmet provided with a speaker, taking advantage of a portion of the helmet which has previously been considered to be dead space, without affecting the external shape of the helmet shell.

SUMMARY OF THE INVENTION

In order to solve the aforementioned problems, a helmet according to this application is characterized by disposing a speaker inside the lower end portion of a helmet.

In this case, the speaker can be mounted facing outwardly or inwardly and the number of speakers may be singular or plural. In the case of plural speakers, they may be provided respectively in a spaced relationship with one another.

It is also possible to provide a hearing-aid function by including an amplifier connected to the speaker and a microphone connected to the amplifier.

Furthermore, the mounting angle of the speaker or speakers may be variable, and as a specific variable speaker mounting angle construction, a plurality of engaging grooves may be provided in an opening of a liner formed in the helmet in order to attach the speaker thereto.

Also, the helmet shell itself can be made to serve as an enclosure of the speaker (or speakers) by positioning the speaker inside the lower end portion of the shell and in contact therewith, or can be fixed to the liner provided at the lower end portion of the helmet inside the shell. In the latter case, an opening may be formed in the liner for mounting the speaker therein.

Moreover, the speaker can be positioned in the lower end portion of the helmet, between the shell and the liner, and in this case, the speaker may be removably clamped in the lower end portion of the helmet, between the shell and the liner.

In addition, it is also possible to position the speaker inside a chin guard. In this case, the speaker may be mounted onto a cover or inner pad removably provided on the shell or liner of the chin guard. Furthermore, the cheek pad may be connected to the chin guard liner and provided with a sound passage communicating between the speaker and the vicinity of the ears of a wearer. The chin guard is a member for protecting the chin of the wearer, and may be formed as a portion of the shell as in a full-face type helmet, but the chin guard may also be formed as a separate structure removably mounted on a jet-type or open-face helmet or the like.

In a helmet according to the present invention, since a speaker is positioned inside the lower end portion of the helmet, a relatively large gap formed between the lower end portion of the helmet and the head of the wearer can be utilized. Thus, the speaker can be mounted in the helmet without affecting the external shape of the helmet shell. In this case, if the speaker is mounted facing outwardly or inwardly, or the mounting angle is changed or the number of speakers is increased, the tone and sound volume can be adjusted according to personal taste. Moreover, it is anticipated that the stereophonic feeling would be improved if a plurality of speakers are positioned in a spaced-apart relationship.

When an amplifier and a microphone connected to the amplifier are equipped together with the speaker, external sounds collected by the microphone are input to the amplifier so as to be amplified and output in the helmet with a greater volume in order to function as a hearing aid.

Furthermore, if the speaker is disposed inside on the lower end portion of the shell, and in contact therewith, or is mounted to the liner provided on the lower end portion inside the shell, the shell itself or the portion including the liner functions as an enclosure surrounding the speaker, thereby the tone and sound volume are changed by the difference of respective mounting objects. When mounting the speaker to the liner, if an opening is formed at the speaker mount of the liner, the passage of sound is improved.

Moreover, when the speaker is inserted in the lower end portion between the shell and the liner, it can be simply mounted by being clamped therebetween. At this time, if the speaker is mounted removably, it can be removed if necessary and used separately.

When the speaker is positioned inside the chin guard, the sound reaches the ear from the front and at the same time, the relatively large dead space in a full-face type helmet whose chin guard is located at the lower portion, can be effectively utilized.

In addition, if the speaker is mounted to a cover or an inner pad removably provided on the shell or liner of the chin guard, the speaker can easily be mounted and dismounted. When a sound passage is formed in the cheek pad, the propagation of sound to the wearer's ear from the speaker is facilitated.

A sound device for a helmet according to the present invention involves the following advantages.

First, if a speaker is disposed inside the lower end portion of a helmet, the speaker can be contained in the helmet without affecting the external shape of the helmet-shell. Accordingly, a space which was previously considered a dead space can be effectively used as a mounting space for the speaker, and further the external appearance of the helmet is not influenced, so that the mounting of a speaker can avoid previous design restrictions.

In addition, when the speaker is mounted facing outwardly or inwardly or the mounting angle is changed or the number of speakers is increased, the tone and sound volume can be adjusted freely according to personal taste. At this time, if the speakers are spaced apart, the stereophonic feeling can be improved.

When a microphone is connected to a speaker amplifier, external sound can be intensified within the helmet, so that it can be used as a hearing aid.

Moreover, when the speaker is disposed in contact with the lower end portion inside the shell or mounted to a liner provided inside the lower end portion of the shell, the shell itself or the portion including the liner may be used practically as an enclosure of the speaker, so that it can be constructed usefully as a sound device. Besides, the tone and sound volume can be changed by the difference of respective mounting objects. When an opening is formed in the liner at the speaker mount, the passage of sound is improved.

Furthermore, when the speaker is claimed in the lower end portion between the shell and the liner, the speaker mounting construction can be simplified, and if the speaker is made removable at this time, it can be used separately if necessary, thus the using mode is diversified.

As the sound reaches the ear from the front when the speaker is mounted inside the chin guard, the sound becomes natural to improve a comfortable feeling. In addition, the space formed inside the chin guard previously considered as a relatively large dead space can be effectively utilized, in particular, it is suitable when the lower portion of the chin guard is a part of the full-face type helmet.

Besides, when the speaker is mounted to the cover or inner pad provided removably on the shell or liner of the chin guard, the speaker can be mounted and dismounted or replaced simultaneously with the replacement of removable parts, so that the operability can be improved, and production change due to the difference in specification with or without the speaker can be simplified.

Moreover, since the sound propagation efficiency is improved when the sound passage is formed in the cheek pad, the sound can thus be heard more easily.

BRIEF DESCRIPTION OF THE DRAWINGS

The advantages of the invention will become apparent in the following description taken in conjunction with the drawings, wherein:

FIG. 1 through FIG. 4 show the first embodiment, in which

FIG. 1 is a longitudinal sectional view;

FIG. 2 is an external side view;

FIG. 3 is an external front view;

FIG. 4 is a reduced sectional view taken along the line 4—4 of FIG. 3;

FIG. 5 through FIG. 7 and FIG. 19 show a second embodiment, in which FIG. 5 is a longitudinal sectional view;

FIG. 6 is a sectional view of an essential portion;

FIG. 7 is a characteristic diagram of an auto-volume;

FIG. 8 through FIG. 10 show a third embodiment, in which:

FIG. 8 is a partially cutaway perspective view of an essential portion;

FIG. 9 is a perspective view of an essential portion;

FIG. 10 is a reduced sectional view taken along the line 10—10 of FIG. 8;

FIG. 12 and FIG. 13 show a fifth embodiment, in which

FIG. 12 is a front view of an essential portion;

FIG. 13 is a enlarged sectional view taken along the line 12—12 of FIG. 12;

FIG. 15 through FIG. 17 show a seventh embodiment, in which

FIG. 15 is a partially cutaway perspective view of an essential portion;

FIG. 16 is a sectional view taken along the line 16—16 of FIG. 15;

FIG. 17 is an enlarged perspective view of an essential portion;

FIG. 19 is a system diagram of a speaker; and

DETAILED DESCRIPTION OF THE PREFERRED EMBODIMENTS

Figure 1:
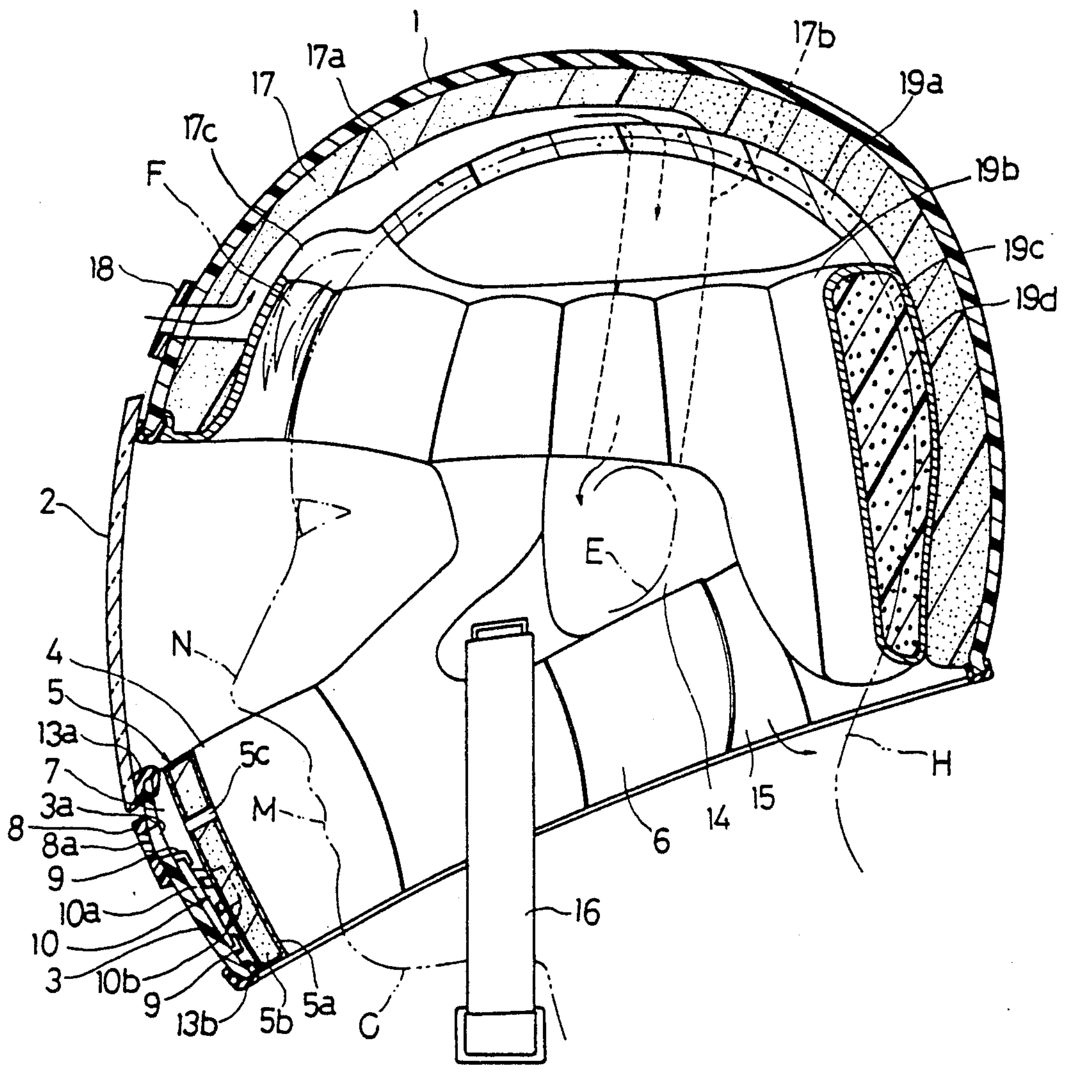
Figure 2:
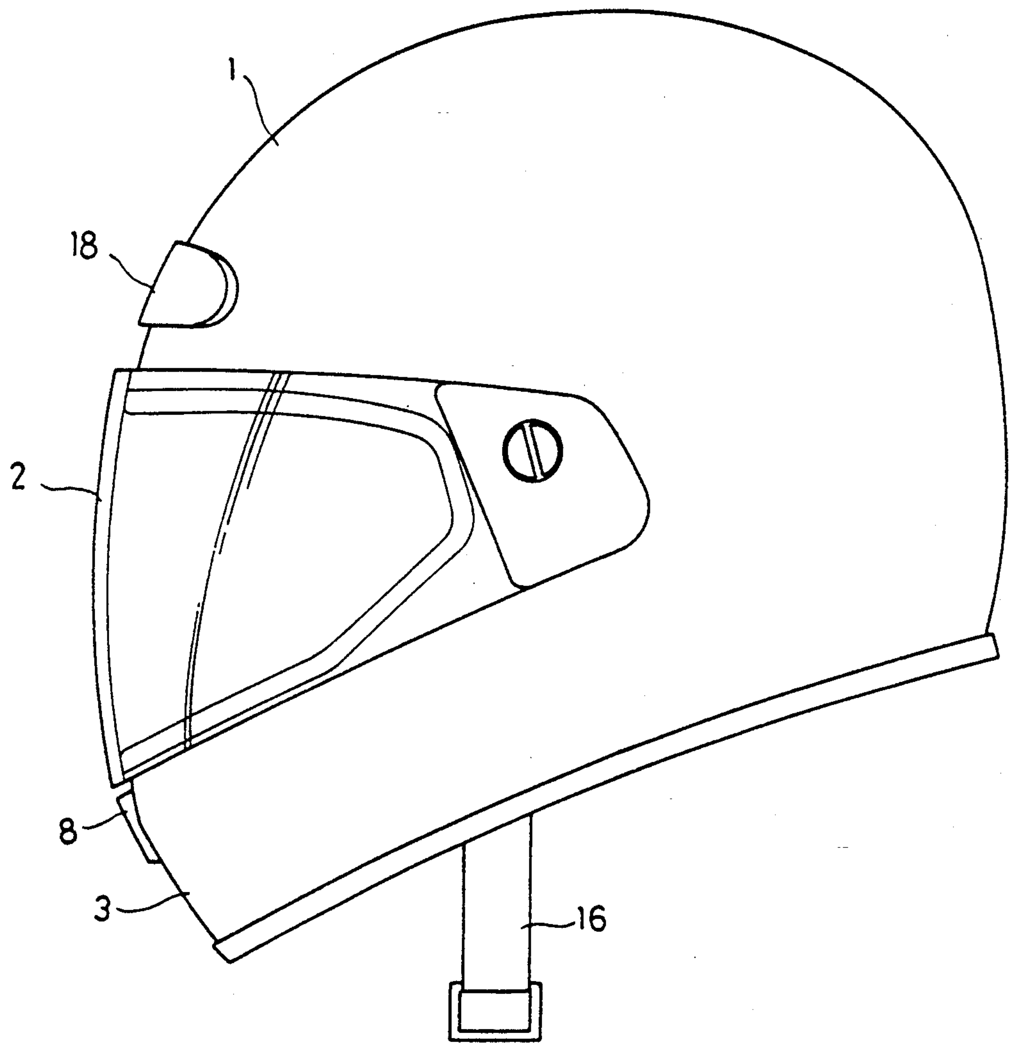
Figure 3:
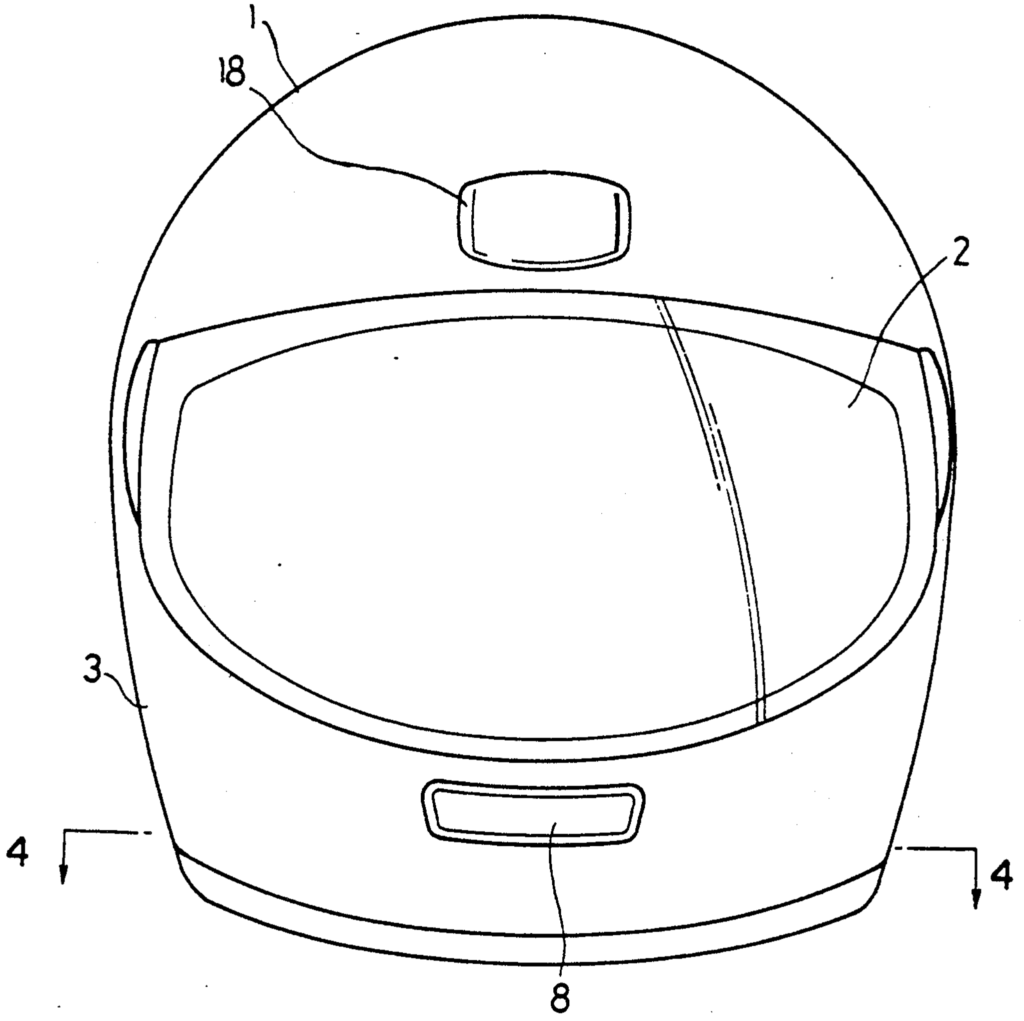
Figure 4:
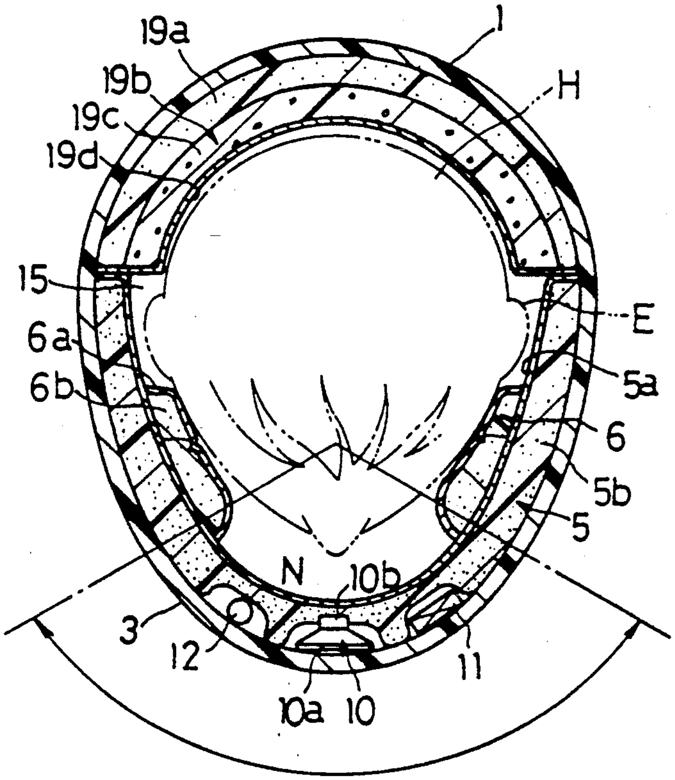

One embodiment of the present invention is shown in FIG. 1 through FIG. 4. FIG. 1 is a longitudinal sectional view of a full-face type helmet whose external shapes are shown in FIGS. 2 and 3, and FIG. 4 is a sectional view taken along the line 4—4 of FIG. 3.

As shown in the figures, a helmet comprises a shell 1 made of a suitable rigid synthetic resin such as a fiber reinforced plastic (FRP), a shield 2 made of a transparent resin and provided at the front window portion in an open-and-close fashion, and a chin guard 3 formed at the lower front portion of the shell 1.

The chin guard 3 is a rigid portion which is formed so as to protect the chin portion C of a wearer (the head portion of the wearer is indicated at a symbol H) including the mouth M, and is formed in a single body with shell 1. An opening formed at the bottom portion of the shell 1 for allowing the head portion H to move in and out, leaves a gap between the periphery of the head portion H and the chin guard 3 to form a dead space therebetween. In particular, the lower portion of the chin guard 3 is contracted inwardly to form a relatively large space 4 between the face and the chin guard. The space 4 is a space which is provided inevitably for mounting an inner material in the shell 1, and forms the dead space described above.

A lower liner 5 and a cheek pad 6 are provided inside the chin guide 3. The lower liner 5 is constituted of a shock absorbing member **5*b* consisting of a buffer material such as foamed polystyrene and covered with a surface layer 5*a* such as a vinyl chloride leather. The cheek pad 6 is formed around the rear portion of the lower liner 5 as shown in FIG. 4, and consists of a soft polyurethane foam 6*b* covered with a surface layer 6*a*** consisting of a raising cloth.

As shown in FIG. 1, a space 7 is formed between the lower liner 5 and the chin guard 3, to which a cover 8 is equipped for ventilation. The cover 8 is designed to adjust the air flow to and from air holes **3*a* and 5*c* formed in the shell 1 and lower liner 5 by means of a slide 8*a***.

Furthermore, on the inner surface side of the chin guard 3, engaging portions 9 protruding toward the space 7 are provided, and to which a speaker 10 is outwardly mounted.

An outer portion **10*a* of the speaker 10 is arranged to contact the inner surface of the chin guard 3, and is pressed against the chin guard 3 by a coil portion 10*b* biased forward by the lower liner 5**.

As shown in FIG. 4, an amplifier 11, battery 12 and so on constituting audio components are mounted in the vicinity of speaker 10. The mounting area of these components is preferably between the two cheek pads 6,6 (e.g area indicated by the arrow in FIG. 4). Reference numerals **13*a*, 13*b* generally indicate edge rubbers for protecting the upper and e port of the chin guard 3. In the cheek pads 6, recesses 14 are formed at the portions corresponding to the ears E of a wearer, and moreover, the rear portion of the cheek pad 6 is formed into a groove 15 connecting with recess 14. The numeral 16 indicates a chin band fixed directly to the shell 1**.

Furthermore, as shown in FIG. 1, a top liner 17 is provided inside the upper shell 1. The top liner 17 is constituted of a buffer material such as foamed polystyrene, and an air groove 17*a* is formed from front to back in the front half portion thereof. The front end portion of the air groove 17*a* is in communication with ventilation means 18 provided on the front portion of the shell 1. In addition, the rear half portion of the air groove 17*a* is curved in both sides at the top to form side grooves 17 communicating with the recesses 14 of the cheek pads 6. Thereby, the air flows to the ears E from the outside through the air grooves 17*a* and 17*b*, and out through the groove 15 as indicated by the arrows, so that the air flows smoothly around the ears to improve the sound.

A space 17*c* is formed in the front portion of the top liner 17 by a step, thereby a forelock F of the wearer is kept in shape.

Furthermore, at the top portion of the top liner 17, a top pad 19*a* is installed and on the side portion, and an inner pad 19*b* is mounted to cover the head H. The inner pad 19*b* is constituted by a soft urethane foam 19*c* covered with a raising-cloth like surface layer 19*d*. The inner pad 19*b* is adapted to connect to the cheek pad 6.

As shown in FIG. 4, the lower liner 5 is in one body with the cheek pad 6 and its rear portion is connected to the separate top liner 17 and inner liner 19*b*. Therefore, the lower liner 5 and cheek pad 6 are removable as one unit. As this time, as with the embodiments to be described later, if battery 12 and other components are mounted on the lower liner 5, these components can also be handled as one unit. It is therefore convenient when replacing the parts or changing the specification with or without these audio components.

In the helmet thus constructed, when an external cassette recorder or the like (refer to FIG. 9) is connected so as to be output from speaker 10, it is believed that the helmet serves as the enclosure in a speaker box, and in spite of the speaker 10 being provided in the front portion of the chin guard 3, the sound propagates entirely through the helmet to produce a relatively good tone and ample sound volume as if the speaker 10 was equipped at the head top or the sides of ears. It is believed that, when the sound originated from the speaker 10 toward the helmet is propagated to the ear E, the sound changes suitably by passing various propagation passages such as when the sound of the speaker 10 is propagated to the ear E directly through the space in the helmet, when the sound is propagated by vibrating the chin guard 3 and shell 1, or when the sound is propagated by vibrating the lower liner 5 and chin pad 6. The above change occurs due to echoes and resonances in the helmet. By controlling these various propagation passages, ample sound can be obtained. Further, since the sound source is located in front of the helmet, it sounds natural to the ear.

In addition, since the mounting position of the speaker 10 effectively utilizes the space 4 in the chin guard 3 which was previously a dead space, it is not necessary to change the external shape of the helmet shell, thus avoiding the design restriction entirely.

Figure 5:
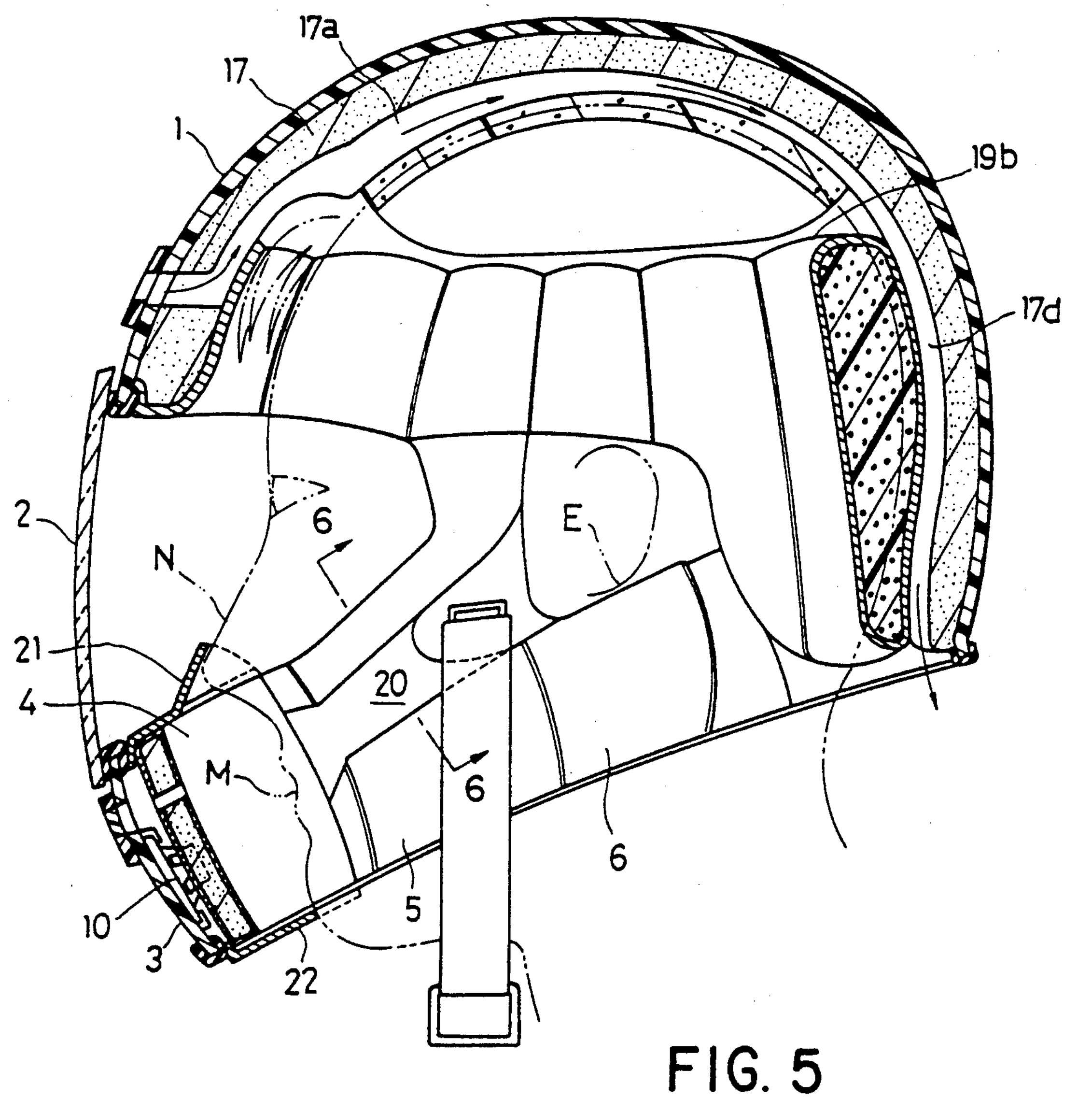
Figure 6:
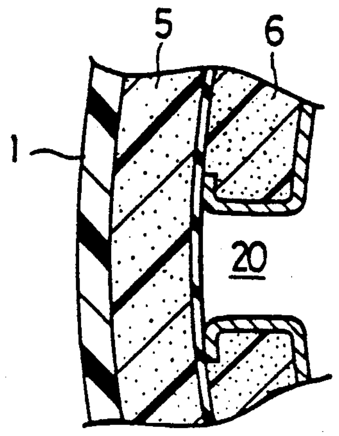
Figure 7:
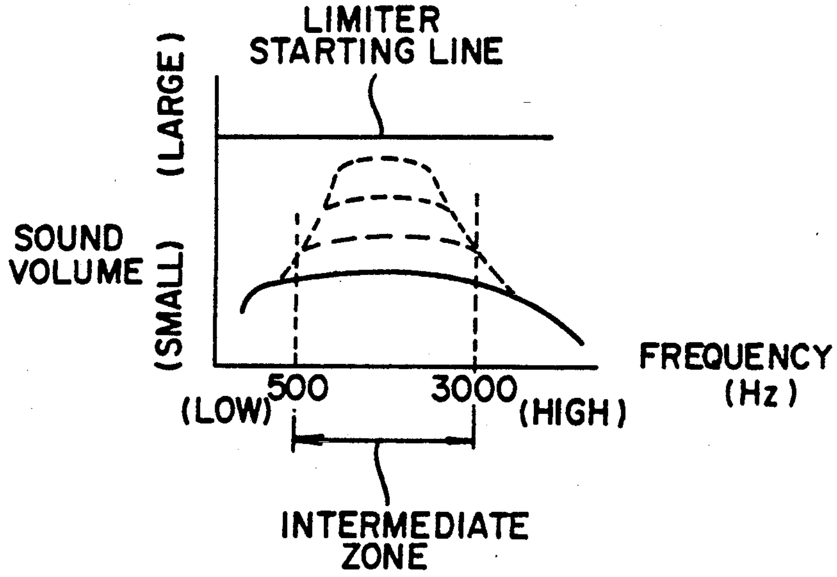

FIGS. 5 and 7 show a second embodiment of the invention. In this second embodiment, a second passage is formed in the helmet of FIG. 1 to further improve the propagation of sound to the ear. Like parts having the same construction and function as the preceding embodiment are shown by like reference characters for description, and the same applies also in the following embodiments.

Although the helmet is a full-face type helmet similar to the preceding embodiment, it differs in that a sound passage 20 provided in the cheek pad 6 is provided for communicating the space 4 and the ear E. The nose N and chin C are adapted to be covered by well known covers 21 and 22 consisting of a suitable cloth or the like mounted to the upper and lower edge portions of the chin guard 3, so that blurring of the shield 2 due to the moisture caused by breathing is prevented. These covers 21 and 22 are provided as required. When thus constructed, since the sound of the speaker 10 reaches the ear E from the space 4 closed by the covers 21 and 22 through the sound passage 20, the sound propagation efficiency is improved and the sound volume can be increased much more.

Since the sound passage 20 is formed, the air passage 17*a* in the top liner 17 is formed from front to back and led directly to the rear head portion by the rear portion 17*d*.

Figure 19:
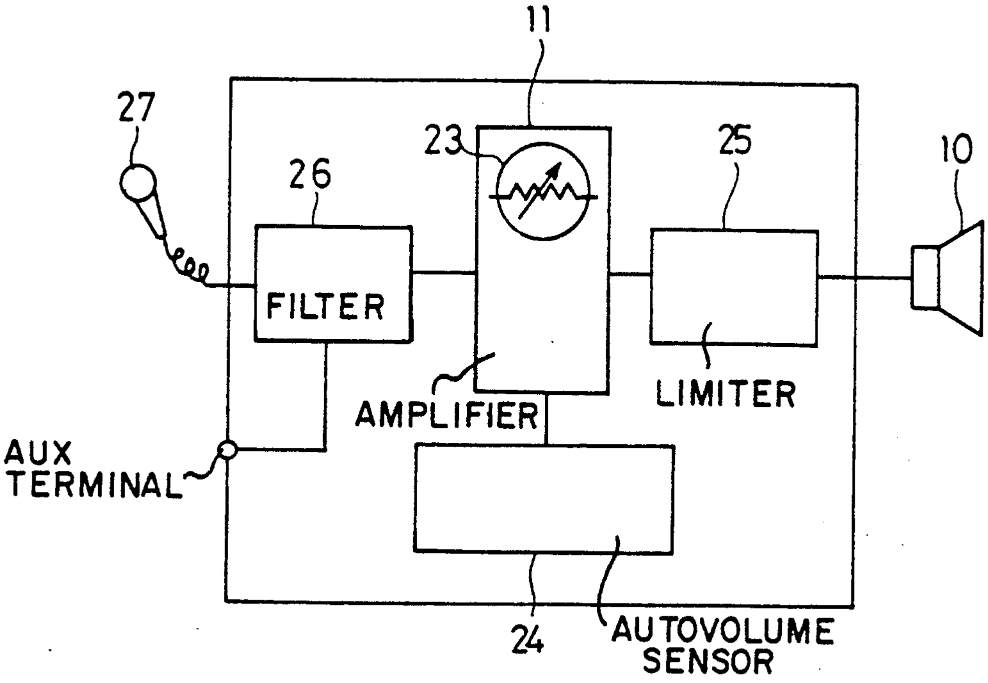

Furthermore, an auto-volume system for adjusting the sound volume responsive to the speed is connected to the speaker 10. FIG. 19 shows a system diagram of the auto-volume system, in which an AUX terminal which is an external input terminal and, for example, a well known hot-wire type auto-volume sensor 24 are connected to the amplifier incorporating a manual volume 23. The sound signal input from the AUX terminal is amplified in proportion to the vehicle speed, for example, when the vehicle speed increases the sound volume of the speaker 10 is raised responsive thereto. However, since a limiter 25 is provided between the amplifier 11 and speaker 10, when the output of the amplifier is increased more than necessary, the sound volume of the speaker 10 can be restrained at a preset upper limit value. The auto-volume system is adjusted so that, for example, as shown in FIG. 7, only the medium range rises and falls corresponding to the speed.

As shown in FIG. 19, in the present embodiment, a microphone 27 is connected to the amplifier 11 via a filter 26. The microphone 27 is, for example, disposed outside the shell 1 to amplify the external sound to a relatively larger sound so as to be outputted from the speaker 10. Thus, the helmet itself functions as a hearing aid to facilitate hearing of the external sound even when the helmet is worn. Besides, it is efficacious as a hearing aid for a handicapped person.

Respective third through fifth embodiments shown in FIG. 8 through FIG. 13 show examples of the speaker mounting construction. However, it will be appreciated that the mounting construction is not limited to these embodiments, and various different constructions are possible.

Figure 8:
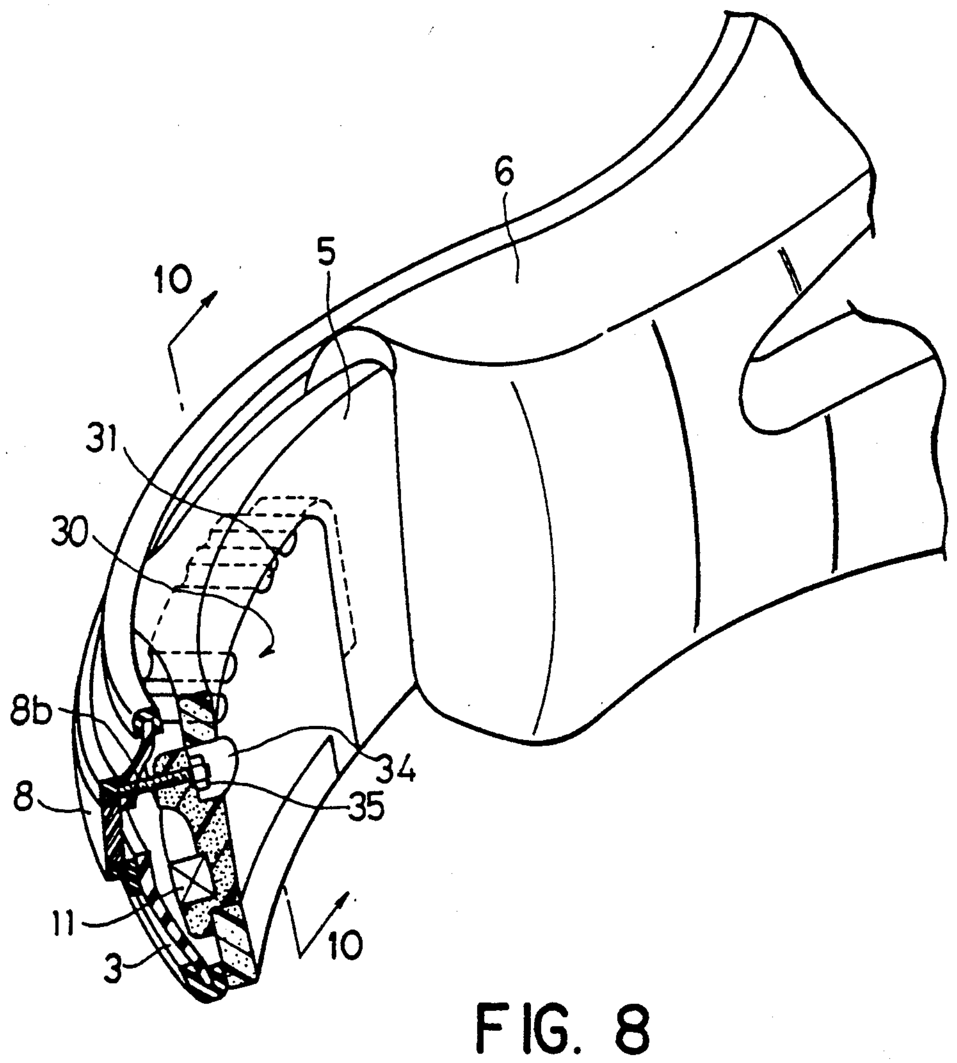
Figure 9:
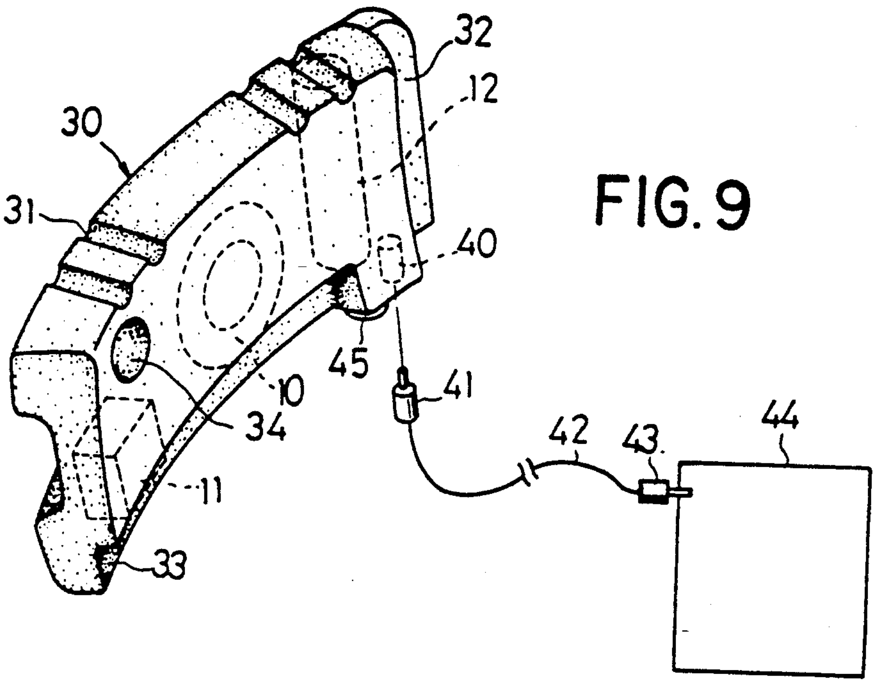
Figure 10:
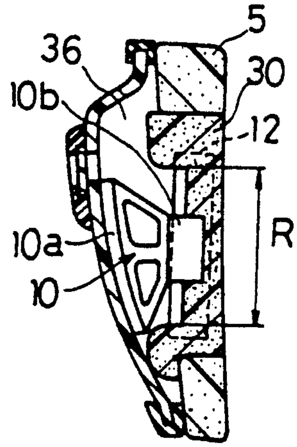

FIG. 8 through FIG. 10 show the third embodiment. In this embodiment, the speaker mounting construction is modified and as shown in FIG. 8, a removable type inner pad 30 is provided on the lower liner 5 and the speaker 10, amplifier 11, battery 12 etc. are mounted to the helmet before inner pad 30. A grooved air passage 31 is formed at the upper portion of the inner pad 30 and a hanger portion 32 protrudes on the side to engage to the lower liner 5 by insertion. At the lower portion, a step 33 is formed so as to be engaged to the lower end-portion of the lower liner 5. Moreover, in an upper corner of the inner pad 5, a fixing hole 34 for securing the inner pad 30 to side of chin guard 3 is formed. Into the fixing hole 34, as shown in FIG. 8, a nut 35 is inserted and mated with a bolt 8*b* protruding in a single body from the cover 8 to secure it to the side of the chin guard 3.

As shown in FIG. 10, in the state where the inner pad 30 is mounted, the outer portion 10*a* of the speaker 10 is biased against the inner surface of the chin guard 3 and the coil portion 10*b* of the speaker 10 is engaged in a recess 36 formed in the inner pad 30. A maximum inside diameter R of the recess 36 is approximately the same as the outer portion 10*a* of the speaker 10, so that when mounting the speaker 10 inwardly, the outer portion 10*a* is engageable with recess 36.

As shown in FIG. 9, an input connector 40 is provided at the lower portion of the inner pad 30, to which a plug 41 may be removably engaged. The plug 41 is connected via a connecting cord 42 to another plug 43, which is adapted to be connected to the output portion of a cassette recorder 44 or the like. In the vicinity of the input connector 40, a switch 45 used commonly as a volume switch is provided. When thus arranged, the speaker 10 can be mounted simultaneously with the installation of inner pad 30, and moreover, when the speaker 10 becomes unnecessary, it can be removed and only the inner pad 30 is mounted, thus the change of the specification of the helmet is simplified. In addition, the tone may be changed by changing the mounting direction of the speaker to face inwardly or outwardly.

Figure 11:
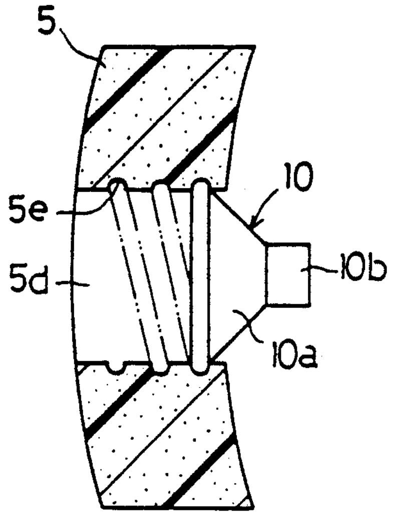
FIG. 11 is a sectional view of an essential portion showing a fourth embodiment.

FIG. 11 shows the fourth embodiment of the invention. In this embodiment, an opening 5*a* having a slightly smaller inside diameter than the outer portion 10*a* of the speaker 10 is formed in the lower liner 5, and a suitable number of engaging grooves 5*e* to which the outer portion 10*a* is engaged are formed in its inner surface. When thus arranged, its mounting angle can be tilted optionally by engaging with any of the engaging grooves 5*e*, and thereby the tone and sound volume can also be changed. However, the mounting construction for adjusting the speaker angle is not limited to the present embodiment, but various other constructions are possible.

Figure 12:
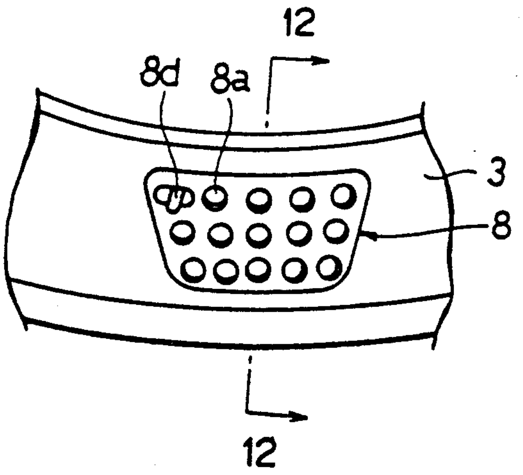
Figure 13:
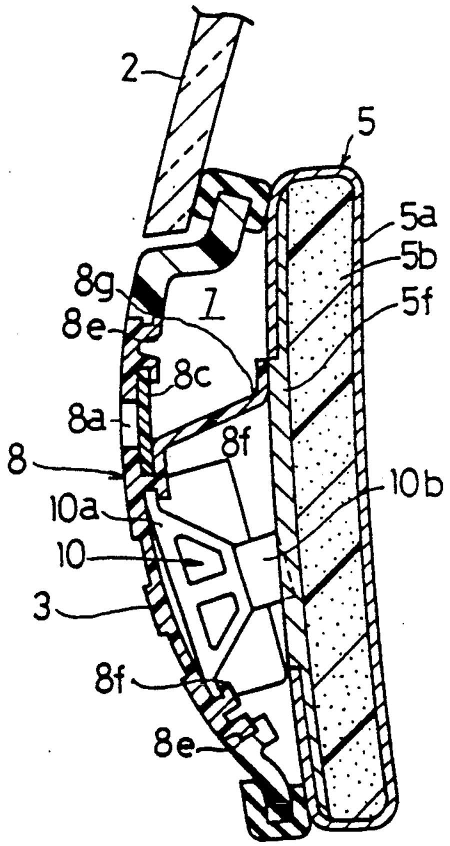

FIGS. 12 and 13 show the fifth embodiment of the invention, wherein FIG. 12 shows an external shape of the removable cover 8 mounted on the chin guard 3, and FIG. 13 shows its longitudinal sectional view. A suitable number of air holes 8*a* are formed in the cover 8, inside of which a slider 8*c* is provided. The slider 8*c* can be opened and closed in both directions by means of a knob 8*d*.

On the inner surface of the cover 8, indented-shape engaging portions 8*e* are formed, thereby the cover is engaged with the peripheral edges of holes formed in the chin guard 3 in advance. Hooked engaging portions 8*f* are formed on the inner surface side of the cover 8, to which the outer portion 10*a* of the speaker 10 is supported. The numeral 8*g* generally denotes a plate member formed integrally with the engaging portion 8*f* by extending from the vicinity of the slider 8*c*. The end portion of the plate member 8*g* contacts the lower liner 5 to divide the space 7 into upper and lower portions, so that the upper portion is defined as a duct communicating with the air holes 8*a*, and is so arranged that the sound of the speaker 10 is not leaked to reduce the sound volume.

The coil portion 10*b* of the speaker 10 is biased forward by the lower liner 5. In addition to the surface layer 5*a* and buffer material 5*b*, a plate 5*f* is provided on the lower liner 5 at the portion contacting coil portion 10*b*. When thus constructed, since the speaker 10 can be installed and removed simultaneously with the cover 8, installation and replacement are simplified. Besides, when the speaker is not installed, it is just enough to mount the cover 8, so that the specification can be simply modified.

Figure 14:
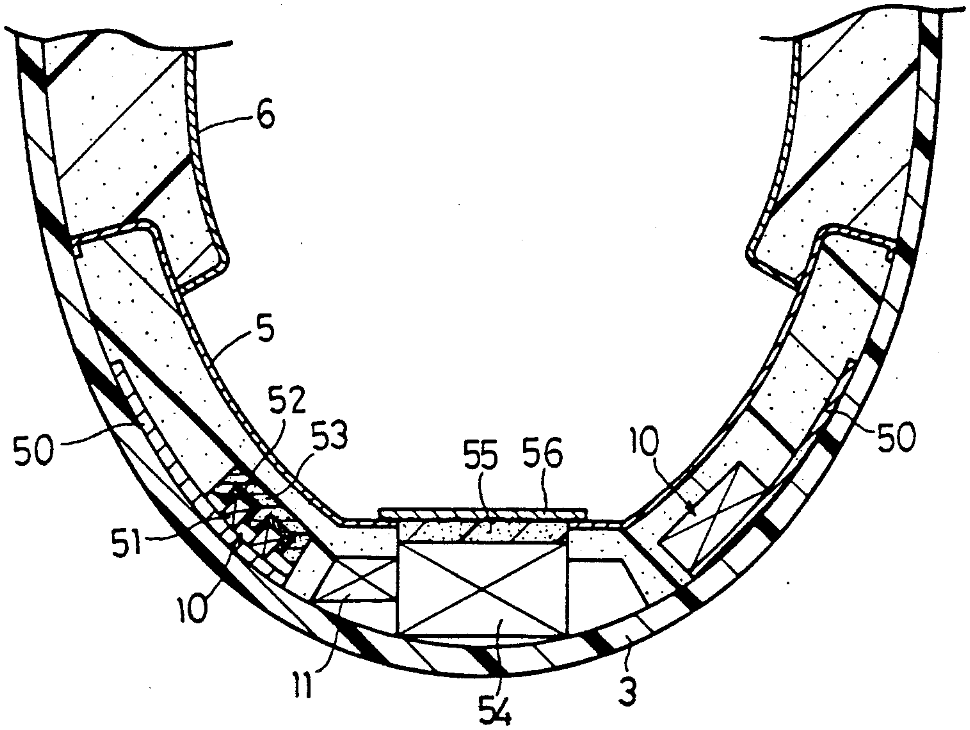
FIG. 14 is an enlarged partially sectional view of an essential portion showing a sixth embodiment.

FIG. 14 shows the sixth embodiment of the invention, in which a sectional view of a portion of the chin guard 3 corresponding to FIG. 4 is shown. In this embodiment, two speakers 10 are provided on the both sides separately on one end of diaphragms 50. Each diaphragm 50 is disposed between the lower liner 5 and the chin guard 3 and extends to the neighborhood of the cheek pad 6 along the chin guard 3 and lower liner 5.

Although the sectional construction is shown only for the left side speaker 10 in the figure, it is constituted of a voice coil 51, magnet 52 etc. and a damper 53 consisting of a sponge material is disposed between their surface and the liner.

Furthermore, at the front center portion of the chin guard 3, a battery box 54 for containing a battery is provided and fixed to the lower liner 5 by means of a face fastener 56 via a sponge 55.

When the speakers 10 are mounted separately on both sides, the stereophonic feeling can be increased.

In addition, by installing the speakers 10 on both sides, the battery box 54, amplifier etc. may be disposed in the center portion of the chin guard 3 to utilize the dead space more effectively.

It is also possible to provide more speakers.

Figure 15:
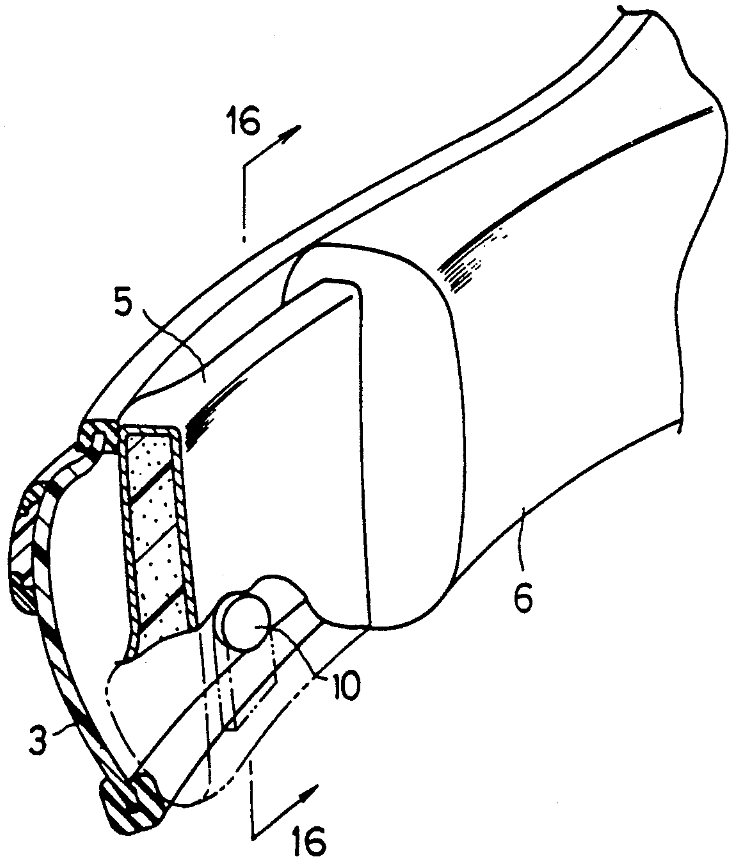

FIG. 15 through FIG. 17 show the seventh embodiment of the invention, in which an earphone type speaker 10 is installed. FIG. 15 is a partially cutaway internal view of the chin guard 3, FIG. 16 is a longitudinal sectional view and FIG. 17 is an external view showing only the lower liner 5 and cheek pad 6. As shown in these figures, on the outside portion of the lower liner 5, grooves 5*g* communicating downwardly are formed. When the earphone type speaker 10 is inserted into the grooves 5*g* from below, as shown in FIG. 16, it is clamped between the chin guard 3 and the lower liner 5 and supported by the edge rubber 13*b* at the lower portion, so that it can be removably mounted between the chin guard 3 and the lower liner 5. Thus, the earphone type speaker 10 can be simply mounted and removed, and when the helmet is not used, the speaker 10 can be removed and fit to the ear directly as an earphone.

Figure 18:
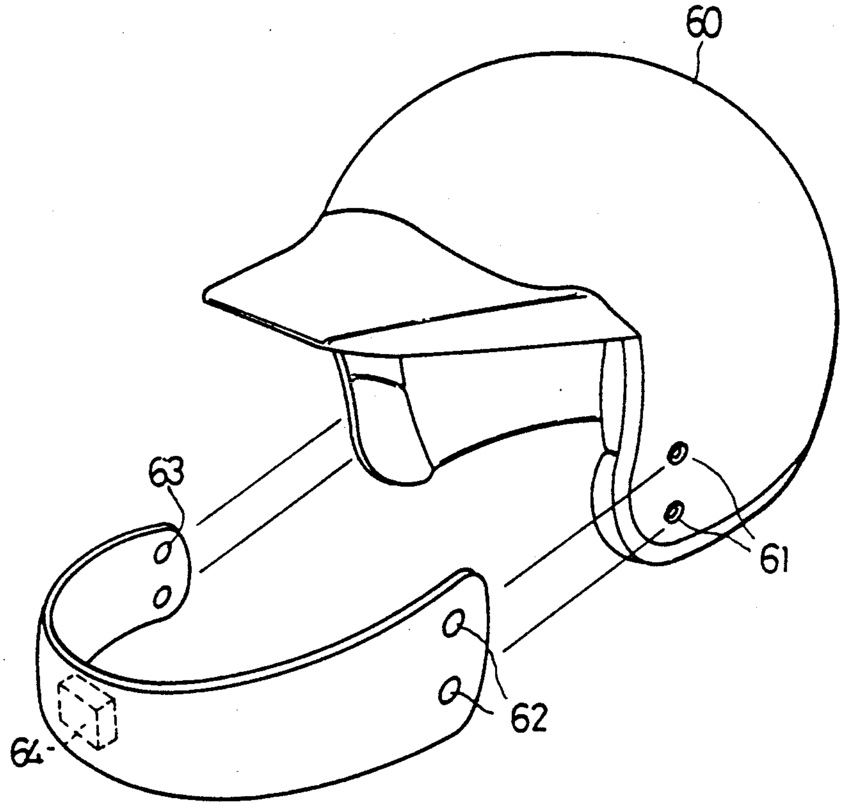
FIG. 18 is an expanded perspective view showing an eighth embodiment.

FIG. 18 shows the eight embodiment, in which a helmet 60 is a jet or open-face type and mounts 61 consisting of suitable engaging members are formed on both sides at its front lower portion. A chin guard 62 for protecting the chin is constituted as a separate removable rigid member, and is removably fixed to the mounts 61 of the helmet 60 by means of mounts 63 provided on the both sides thereof. Audio components 64 consisting of a speaker, amplifier and battery are mounted in a single body to the inner front portion of the chin guard 62. When thus arranged, even in a helmet such as a jet-type helmet wherein the chin guard is not integrated as in a full-face type helmet, the speaker etc. can be similarly mounted.

Figure 20:
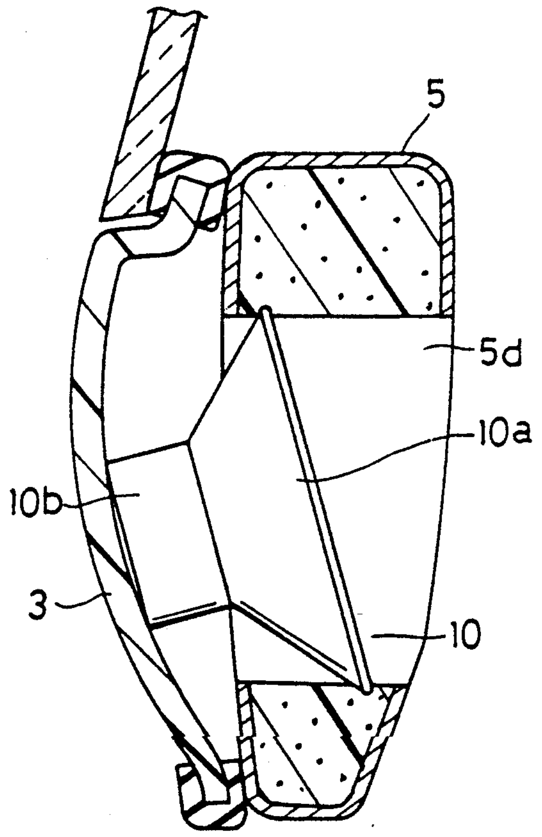
FIG. 20 is a sectional view of an essential portion according to a ninth embodiment.

FIG. 20 shows the ninth embodiment of the invention, in which the speaker 10 is mounted inwardly. That is, the outer portion 10 engages with an opening 5*d* formed in the lower liner 5 and the coil portion 10*b* is pressed against the inner surface of the chin guard 3.

In this case, the coil portion 10b is fixed to the shell 3 or the outer portion 10a is engaged in the opening 5d in advance. When thus constructed, the tone and sound volume is different from those constructions when the speaker 10 is mounted outwardly. In the embodiments described heretofore, although the speaker 10 was mounted outwardly, for example, the speaker 10 of respective first and second embodiments shown in FIG. 1 and FIG. 5 may be optionally mounted inwardly as in the present embodiment.

Although specific embodiments of the instant invention have been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

I claim:

1. A helmet having a sound device therein, comprising:

a shell of a rigid material for protecting a head of a wearer;

a chin guard connected to said shell for protecting a chin of the wearer;

a liner mounted inside said shell and said chin guard;

a cover is removably disposed outside of said chin guard;

a speaker mounted inside a central part of said chin guard, said speaker mounted between said chin guard and said liner.

2. The helmet of claim 1, wherein said speaker is mounted inside said center part of the chin guard of the helmet to face outwardly.

3. The helmet of claim 1, wherein said speaker is mounted inside said center part of the chin guard of the helmet to face inwardly.

4. The helmet of claim 1, wherein a plurality of speakers are mounted inside said center part of the chin guard of the helmet, and are spaced apart from one another.

5. The helmet of claim 1, further comprising:

an amplifier connected to said speaker;

a microphone connected to said amplifier such that said helmet serves as a hearing aid.

6. The helmet of claim 1, including variable mounting means for varying a mounting angle of the speaker.

7. The helmet of claim 1, wherein said speaker is mounted to said liner which is disposed inside said center part of said chin guard of the helmet.

8. The helmet of claim 7, wherein said liner has an opening for receiving said speaker therein.

9. The helmet of claim 1, wherein said speaker is removably mounted between said center part of said chin guard and said liner.

10. The helmet of claim 1, wherein said chin guard is integrally formed with the shell of said helmet.

11. A helmet according to claim 1, wherein an air hole is provided in an upper portion of said chin guard portion and said air hole communicates with a space formed between said chin guard and said liner, and said speaker positioned below said air hole.

12. A helmet having a sound device therein, comprising:

a shell of a rigid material for protecting a head of a wearer;

a chin guard connected to said shell for protecting a chin of the wearer;

a liner mounted inside said shell and said chin guard;

an inner pad is removably disposed on said liner in said chin guard;

a speaker mounted inside a central part of said chin guard, said speaker mounted on said inner pad.

13. The helmet of claim 12, wherein said helmet is a full-face type helmet and said shell and said chin guard are formed integrally as a single body, and said chin guard is contracted at a lower portion.

14. The helmet of claim 12, further comprising a cheek pad disposed inside said shell and connected to said liner to form a sound passage communicating from said speaker to the vicinity of the ears of the wearer.

15. A helmet according to claim 12, wherein the liner of said chin guard is detachable.

16. A helmet having a sound device therein, comprising:

a shell of a rigid material for protecting a head of a wearer;

a liner mounted inside said shell and filled with a buffer material;

a speaker mounted inside a lower end portion of the shell of the helmet; and a variable mounting means for varying a mounting angle of the speaker, said variable mounting means comprises a plurality of engaging grooves formed in an opening of said liner such that said speaker is engageable with said engaging grooves at different angles.

* * * * *